United States Patent
Gamble et al.

(10) Patent No.: US 9,574,126 B2
(45) Date of Patent: Feb. 21, 2017

(54) GLYCOL ETHER AMINES FOR USE AS CLAY AND SHALE INHIBITION AGENTS FOR THE DRILLING INDUSTRY

(71) Applicant: Dow Global Technologies LLC, Midland, MI (US)

(72) Inventors: Aleksandr T. Gamble, Midland, MI (US); Cole A. Witham, Pearland, TX (US); Michael K. Poindexter, Sugar Land, TX (US); Felipe A. Donate, Midland, MI (US); Kyle R. Essenmacher, Midland, MI (US); Stephen W. King, League City, TX (US); John Beckerdite, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 182 days.

(21) Appl. No.: 14/407,974

(22) PCT Filed: Jun. 19, 2013

(86) PCT No.: PCT/US2013/046489
§ 371 (c)(1),
(2) Date: Dec. 15, 2014

(87) PCT Pub. No.: WO2014/004193
PCT Pub. Date: Jan. 3, 2014

(65) Prior Publication Data
US 2015/0166867 A1    Jun. 18, 2015

Related U.S. Application Data

(60) Provisional application No. 61/663,644, filed on Jun. 25, 2012.

(51) Int. Cl.
C09K 8/22 (2006.01)
(52) U.S. Cl.
CPC ............. *C09K 8/22* (2013.01); *C09K 2208/12* (2013.01)
(58) Field of Classification Search
None
See application file for complete search history.

(56) References Cited

U.S. PATENT DOCUMENTS

| | | | |
|---|---|---|---|
| 4,605,068 A | 8/1986 | Young et al. | |
| 4,664,818 A | 5/1987 | Halliday et al. | |
| 5,197,544 A | 3/1993 | Himes | |
| 5,208,216 A * | 5/1993 | Williamson | C09K 8/24 507/120 |
| 5,728,653 A | 3/1998 | Audibert et al. | |
| 5,771,971 A | 6/1998 | Horton | |
| 5,908,814 A | 6/1999 | Patel et al. | |
| 6,247,543 B1 | 6/2001 | Patel et al. | |
| 6,484,821 B1 | 11/2002 | Patel et al. | |
| 6,544,933 B1 | 4/2003 | Reid et al. | |
| 6,609,578 B2 | 8/2003 | Patel et al. | |
| 7,091,159 B2 | 8/2006 | Eoff et al. | |
| 2002/0155956 A1 | 10/2002 | Chamberlain et al. | |
| 2003/0106718 A1 | 6/2003 | Patel et al. | |
| 2009/0247429 A1 * | 10/2009 | Miller | C09K 8/22 507/130 |
| 2012/0028855 A1 * | 2/2012 | Miller | C09K 8/22 507/129 |

FOREIGN PATENT DOCUMENTS

| | | |
|---|---|---|
| WO | 2006013595 | 2/2006 |
| WO | 2006013596 | 2/2006 |

* cited by examiner

*Primary Examiner* — John J Figueroa

(57) ABSTRACT

The hydration of clays and shale in drilling operations may be inhibited by employing an aqueous based drilling fluid comprising a shale hydration inhibition agent having the formula: (Formula I should be inserted here.) wherein R is hydrogen or an alkyl group having 1 to 12 carbons, $R_1$ is an alkylene group having 1 to 12 carbons, and $R_2$ is an alkyl group having 1 to 12 carbons. The shale hydration inhibition agent should be present in the aqueous based drilling fluid in sufficient concentration to reduce the reactivity, such as swelling, of clays and shale when exposed to water-based drilling fluids.

(I)

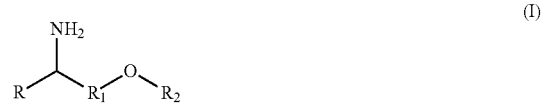

4 Claims, No Drawings

GLYCOL ETHER AMINES FOR USE AS CLAY AND SHALE INHIBITION AGENTS FOR THE DRILLING INDUSTRY

FIELD OF THE INVENTION

The present invention relates to shale hydration inhibition agents for the drilling industry, specifically glycol ether amine compounds which are effective for the reduction of reactivity, for example the inhibition of swelling, of clay and shale which comes into contact with the fluids used in the drilling and construction of oil and gas wells for the petroleum industry.

BACKGROUND OF THE INVENTION

In the rotary drilling of wells a drilling fluid circulates throughout the underground well to carry cuttings from the bit and to transport these cuttings to the surface. Contemporaneously, the drilling fluid cools and cleans the drill bit, as well as reduces friction between drill string and the drilled hole, and also stabilizes uncased sections of the well. Usually drilling fluids form a low permeability filter cake in order to seal any permeability associated with the surrounding geological formations.

Drilling fluids may be classified according to their fluid base: oil based fluids with solid particles suspended in an oil continuous phase and, possibly, water or brine may be emulsified with the oil. Alternatively, water based fluids contain solid particles suspended in water or brine. Various solids may be added, deliberately or otherwise, to water based drilling fluids: a) organic polymers or clays used to impart viscosity and filtration properties; b) insoluble inorganic minerals to increase the fluid density as well as help decrease fluid loss; c) soluble salts used to increase the mud's density; and d) during the drilling operation formation solids may disperse into the drilling fluid.

Formation solids that become dispersed in a drilling fluid include cuttings from drilling, soil, and solids from surrounding unstable formation. When the formation yields solids that are clay minerals which are reactive, for example swell, disperse, migrate or undergo swelling-induced migration, this can potentially compromise drilling time and increase costs.

Clays are typically composed of sheets or layers of aluminosilicate minerals having exposed surface hydroxyls. The basal plane of the clay surface is negatively charged and as such cations are readily adsorbed onto the surface. These cations may be exchangeable. Substitutions within the clay structure and the presence of exchangeable cations affect the tendency of the clay to swell in water. For example surface hydration gives swelling with water molecules adsorbed on clay surfaces. Many types of clays can swell in this manner.

Another type of swelling is called osmotic swelling, when interlayer ion concentration leaches water between the clay unit layers, swelling the clay. Only some clays can undergo osmotic swelling. All types of clay and shale instability, such as swelling, can cause a series of problems. For example, drag between the drill string and the sides of the borehole may be increased. This can cause loss of fluid circulation and sticking of the drill string and bit.

This is why development of effective clay instability inhibitors is important to the oil and gas exploration industry. The present invention works towards a solution to these difficulties.

Many types of clay inhibitors are known including the use of inorganic salts such as potassium chloride. Numerous patents have been filed which describe techniques or products which can be used to inhibit clay swelling. Without completely summarizing the patent literature, and by way of example, we can cite the inhibitor compositions based on: a) inorganic phosphates, described in U.S. Pat. No. 4,605,068; b) polyalkoxy diamines and their salts, in U.S. Pat. Nos. 6,484,821; 6,609,578; 6,247,543; and US 20030106718; c) choline derivatives described in U.S. Pat. No. 5,908,814; d) oligomethylene diamines and their salts, in U.S. Pat. No. 5,771,971 and US Publication No. 20020155956; e) the addition product of carboxymethyl cellulose and an organic amine, in WO 2006/013595; f) 1,2-cyclohexanediamine and/or their salts, in WO 2006/013597; g) salts of phosphoric acid esters of oxyalkylated polyols, in WO 2006/013596; h) the combination of a partially hydrolyzed acrylic copolymer, potassium chloride and polyanionic cellulose, in U.S. Pat. No. 4,664,818 (Halliday William S., et al.); i) quaternary ammonium compounds, in U.S. Pat. No. 5,197,544; j) polymers based on dialkyl aminoalkyl methacrylate, in U.S. Pat. No. 7,091,159; k) aqueous solutions containing a polymer with hydrophilic and hydrophobic groups, in U.S. Pat. No. 5,728,653; and l) the reaction product of a polyhydroxyalkane and an alkylene oxide, in U.S. Pat. No. 6,544,933.

SUMMARY OF THE INVENTION

The present invention is an aqueous based drilling fluid composition and method of using said aqueous based drilling fluid composition for reducing the reactivity such as swelling of clays and shale in drilling operations wherein the aqueous based drilling fluid comprises an aqueous based continuous phase, a reactive clay or shale material, and a glycol ether amine compound having the following formula:

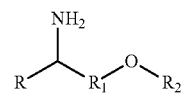

wherein
R is hydrogen or an alkyl group having 1 to 12 carbons, preferably methyl,
$R_1$ is an alkylene group having 1 to 12 carbons, and
$R_2$ is an alkyl group having 1 to 12 carbons,
preferably $R_1$ is an alkylene group having 1 to 3 carbons, more preferably $R_1$ is methylene or ethylene and preferably $R_2$ is an alkyl group having 1 to 6 carbons, more preferably $R_2$ is an alkyl group having 1 to 4 carbons, and more preferably $R_2$ is methyl, ethyl, n-propyl, isopropyl, or n-butyl. Preferably, the shale hydration inhibition compound of the present invention is 2-methoxy-1-aminoethane, 2-ethoxy-1-aminoethane, 2-propoxy-1-aminoethane, 2-butoxy-1-aminoethane, 1-methoxy-2-aminopropane, 1-ethoxy-2-aminopropane, 1-propoxy-2-aminopropane, or 1-butoxy-2-aminopropane.

The aqueous based drilling fluid described herein above may optionally further comprise one or more of a fluid loss control agent, a weighting material, a viscosifying agent, a dispersant, a lubricant, a corrosion inhibitor, a defoamer, salts, or a surfactant.

The aqueous phase of the aqueous based drilling fluid described herein above preferably is fresh water, sea water, brine, mixtures of water and water soluble organic compounds, or mixtures thereof.

DETAILED DESCRIPTION OF THE INVENTION

The present invention is directed to a water-based drilling fluid for use in drilling wells through a formation containing a clay or shale which is unstable (sometimes referred to as reactive clay or shale material) and for example may swell, in the presence of water. Generally the drilling fluid of the present invention includes a shale hydration inhibition agent and an aqueous continuous phase. As disclosed below, the drilling fluids of the present invention may also include additional components, such as a weight material, fluid loss control agents, bridging agents, lubricants, anti-bit balling agents, corrosion inhibition agents, salts, surfactants and suspending agents and the like which may be added to an aqueous based drilling fluid.

During the drilling of wells, a drilling fluid is circulated down the drill string, through the drill bit and back to the surface for reconditioning and reuse. The drilling fluid suspends the drill cuttings originating from the drilling process and transports the cuttings to the surface. At the same time the drilling fluid cools and cleans the drill bit, reduces the friction between the drill pipe and the borehole walls and stabilizes the sections of the well that are prone to collapse.

Normally the drilling fluids form a filter cake of low permeability which prevents leaking into the surrounding geological formations and avoids excessive losses of the liquid phase of the drilling fluid itself. Drilling fluids can be classified according to the nature of their continuous liquid phase. There are oil-based drilling fluids, sometimes referred to as oil-based muds (OBM), in which the solids are suspended in a continuous oleaginous phase and optionally water or a brine phase is emulsified into the oleaginous phase. Alternatively, water-based drilling fluids, sometimes referred to as water-based muds (WBM), contain solids suspended in water or brine or solutions of silicates.

Various chemicals can be added, deliberately or not, to water-based drilling fluids: A) organic polymers or clays, used to impart viscosity and fluid loss reduction; B) insoluble inorganic minerals to increase the fluid density; and/or C) solids that originate from the drilling process. The solids, which disperse into the fluid, include cuttings from the drilling operation and from the unstable geological surrounding formations.

When the drilling operation encounters swellable or reactive clay-like materials, they can compromise drilling time and increase costs. There are different kinds of clays and shale that swell, disperse, and/or migrate and they can cause numerous operational problems. For the purposes of this application, the term "clay" is defined as a variety of phyllosilicate minerals rich in silicon and aluminum oxides and hydroxides which include variable amounts of structural water, illustratively including kaolinite, bentonite, dickite, halloysite, chrysotile, lizardite, amesite, talc, montmorillonite, beidellite, saponite, hectorite, sauconite, vermiculite, muscovite, paragonite, phlogopite, biotite, lepidolite, margarite, clintonite, anandite, donbassite, cookeite, sudoite, clinoclilore, chamosite, nimite, hydrotalcite, meixnerite, stevensite, nontronite, nacrite, hydrobiotite, glauconite, illite, bramallite; chlorite, attapulgite and sepiolite. The clay content of the formations can be comprised substantially of a single species of clay mineral, or of several species, including the mixed layer types of clay.

Also, for the purposes of this application, the term "shale" is defined to mean a fine-grained sedimentary rock formed by the consolidation of clay, silt, or mud. It is characterized by a finely laminated structure which imparts fissures parallel to the bedding along which the rock may easily break. As used herein, the term "shale" is also defined to mean materials that may "swell" or increase in volume or disperse or migrate, when exposed to water. Reactive shale may be problematic during drilling operations because of, inter alia, their tendency to degrade when exposed to aqueous media such as aqueous-based drilling fluids. This degradation, of which swelling is one example, can result in undesirable drilling conditions and undesirable interference with the drilling fluid. For instance, the degradation of the shale may interfere with attempts to maintain the integrity of drilled cuttings traveling up the well-bore until such time as the cuttings can be removed by solids control equipment located at the surface.

Further, for the purpose of this application, the term "shale hydration inhibition agent" refers to an agent that positively affects (e.g., reduces) the reactivity of a reactive clay or shale by reducing one or more of the amount of swelling, dispersing, migration, swelling-induced migration, and the like when in the presence of water.

The swelling increases the friction between the drill pipe and the borehole walls, causes drilling fluid losses and sticking between the drill pipe and the borehole walls. Other forms of shale instability, such as dispersing, migration, swelling-induced migration, and the like, further adversely impact drilling operations. For this reason the development of swelling inhibitors for clays and shale is important for the oil and gas industry. The invention works in this direction to solve these problems.

It has now been found that the shale hydration inhibition agent of the present invention positively affects the reactivity of clay and/or shale. Water-based drilling fluids comprising the shale hydration inhibition agent of the present invention have been revealed to be excellent shale hydration inhibitors for the petroleum industry, being able to effectively inhibit clay and shale swelling in drilling processes and subterranean formations. Shale hydration inhibition agents of the present invention are glycol ether amine compounds represented by the formula:

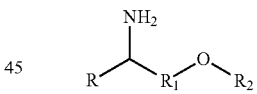

wherein
R is hydrogen or an alkyl group having 1 to 12 carbons, preferably methyl,
$R_1$ is an alkylene group having 1 to 12 carbons, and
$R_2$ is an alkyl group having 1 to 12 carbons,
preferably $R_1$ is an alkylene group having 1 to 3 carbons, more preferably $R_1$ is methylene or ethylene and preferably $R_2$ is an alkyl group having 1 to 6 carbons, more preferably $R_2$ is an alkyl group having 1 to 4 carbons, and more preferably $R_2$ is methyl, ethyl, n-propyl, isopropyl, or n-butyl.

Preferably, the shale hydration inhibition compound of the present invention is 2-methoxy-1-aminoethane, 2-ethoxy-1-aminoethane, 2-propoxy-1-aminoethane, 2-butoxy-1-aminoethane, 1-methoxy-2-aminopropane, 1-ethoxy-2-aminopropane, 1-propoxy-2-aminopropane, or 1-butoxy-2-aminopropane.

The shale hydration inhibition agent should be present in sufficient concentration to reduce either or both the surface hydration based swelling and/or the osmotic based swelling of the clay or shale. The exact amount of the shale hydration inhibition agent present in a particular drilling fluid formulation can be determined by a trial and error method of testing the combination of drilling fluid and shale formation encountered. Generally however, the shale hydration inhibition agent of the present invention may be used in drilling fluids in a concentration from about 1 to about 18 pounds per barrel (lbs/bbl or ppb) and more preferably in a concentration from about 2 to about 12 pounds per barrel of drilling fluid.

The aqueous based drilling mud contains an aqueous based continuous phase and may contain one or more of normally used additives well known by those skilled in the art, such as fluid loss control agents, weighting materials, viscosifying agents, dispersants, lubricants, corrosion inhibitors, defoamers and surfactants; the order in which the additives and the clay inhibitors of the invention are added into the mud is not critical. Useful fluid loss control agents are organic polymers, starches, and mixtures thereof. Useful weighting materials may be selected from: barite, hematite, iron oxide, calcium carbonate, magnesium carbonate, magnesium organic and inorganic salts, calcium chloride, calcium bromide, magnesium chloride, zinc halides, alkali metal formates, alkali metal nitrates and combinations thereof.

The aqueous based continuous phase may generally be any water based fluid phase that is compatible with the formulation of a drilling fluid and is compatible with the shale hydration inhibition agents disclosed herein. In one preferred embodiment, the aqueous based continuous phase is selected from: fresh water, sea water, brine, mixtures of water and water soluble organic compounds, and mixtures thereof. The amount of the aqueous based continuous phase should be sufficient to form a water based drilling fluid. This amount may range from nearly 100 percent of the drilling fluid to less than 30 percent of the drilling fluid by volume. Preferably, the aqueous based continuous phase is from about 95 percent to about 30 percent by volume and preferably from about 90 percent to about 40 percent by volume of the drilling fluid.

EXAMPLES

Preparation of Glycol Ether Amines

Reductive Amination Catalyst.

A solution containing 236 g $Ni(NO_3)_2 \cdot 6H_2O$, 69 g $Co(NO_3)_2 \cdot 6H_2O$, 51 g $Cu(NO_3)_2 \cdot 2.5H_2O$, 20.4 g $NH_4ReO_4$, and 59 g $H_3BO_3$ is prepared in 700 ml of boiling deionized water. This boiling solution is poured into a 1-L beaker containing 150 g of a catalyst support (1/16" sphere alumina support available from UOP under the trade designation SAB-17). This mixture is thoroughly mixed to ensure complete and even wetting of the support. The impregnated support is dried in a crucible at 120° C. for 3 hours with frequent stirring, and then calcined at 300° C. in an air furnace for 3 hours before being stored in a 120° C. oven until activation.

The NiCoCuReB catalyst thus prepared is reduced in an activation chamber. The temperature of the chamber is slowly heated to 350° C. over a period of two hours while a stream of pure hydrogen gas flows through the chamber at about 30 ml/minute. Activation is continued for 4 hours after the temperature reaches 350° C. The heat is then turned off but the hydrogen flow is maintained until the chamber cools to room temperature. The activated catalyst (pyrophoric) is carefully transferred into a bottle in a nitrogen-filled dry box and stored there until use. The resulting catalyst has a total metal loading of 40 percent by weight. It contains a Ni/Co/Cu/Re/B metal weight ratio of 48/14/14/14/10, and both, Ni/Co and Ni/Cu weight ratios of 3.4.

The catalyst is loaded into the reactor inside a nitrogen-filled dry box (oxygen<10 ppm) to prevent deactivation. Ceramic sphere packing (1/8") is used above and below the catalyst so that the catalyst bed is positioned in the constant temperature zone of the reactor.

Glycol Ether Reductive Amination.

A continuous plug-flow reactor system is used for all reductive amination reactions. An ISCO model 500D continuous feed syringe pump system (maximum pressure=3750 psi) with TEFLON seals is used for the glycol ether solvent feed. A second ISCO model 500D syringe pump system is used to feed ammonia at constant flow rates. A Brooks model 5850TR mass flow controller (maximum pressure=4500 psi) in conjunction with a model 5896 digital readout box is used to control the hydrogen flow from a 6000 psig cylinder. A differential pressure regulator ($\Delta P=50$ psig) from Veriflo is used to regulate inlet/outlet bias pressure of the flow transducer. The three feed streams are combined and fed through a coiled preheater (1/8" O.D., 316 stainless steel tubing, 15 feet total length) to a tubular, packed bed reactor. This 316 stainless steel Kuentzel-type reactor (1.25" I.D., 250-ml capacity) made by Autoclave Engineers is rated at 9,500 psi/500° F., and contained 200 ml of the catalyst. A 1/16" diameter thermocouple inserted from the top of the reactor to the center of the catalyst bed is used to monitor the catalyst temperature. Reactor volume not filled with catalyst is filled with glass wool. The reactor pressure is maintained by a back-pressure control valve (BPCV, maximum pressure=6000 psi) manufactured by TESCOM Corporation. From the BPCV, the product solution is collected in a sample bottle.

The plug-flow reactor system is equipped with several automatic shutdown features to warrant around-the-clock unattended operations. The reactor controller has a high temperature cut-off sensor and both ISCO feed pumps have high pressure cut-off capabilities. The hydrogen feed line is blocked by an actuator driven by two electric solenoid valves whenever the high-pressure sensor or the high-temperature sensor detects any over-the-limit reactor pressure or temperature, respectively.

The aminated glycol ethers are isolated as crude reaction mixtures containing residual ammonia, water, and some glycol ether starting material. The ammonia is removed by either bubbling nitrogen through the crude mixtures or by using an evaporator at low pressure (i.e., Büchi rotary evaporator). Further purification of the products is achieved by distillation.

Typical Reaction Conditions.

The reactor conditions used for the reductive amination of the glycol ethers are:
Reactor temperature=170-215° C.
Reactor pressure=1200 psig
Glycol ether solvent feed rate=0.5-1.5 ml/minute
Liquid hourly space velocity (LHSV)=0.15-0.45
$NH_3$/OH molar ratio=20-25
Hydrogen level=3-5 mole percent Purification.

To purify, the 1-methoxy-2-aminopropane is treated first with NaOH pellets to create a separate water layer that is decanted prior to distillation to improve recovery. Analysis of purity is conducted by acid titration, Karl-Fisher water titration, gas chromatography and nuclear magnetic resonance spectroscopy.

A major portion of the water in 1-methoxy-2-aminopropane is removed by addition of NaOH pellets which induce the formation of an aqueous caustic layer. In a typical experiment, 2000 g of 1-methoxy-2-aminopropane is added to a 3 L three-neck flask shaped with an elongated bottom and fitted with an overhead stirrer and a bottom stopcock. The stirrer is turned on and 273 g of NaOH pellets are added scoop wise to the flask in an amount that resulted in an approximately 12 weight percent concentration of NaOH to the combined 1-methoxy-2-aminopropane/NaOH mixture. The mixture is allowed to stir overnight for a minimum of 12 hours. Stirring is arrested and the phases allowed to separate. The bottom "water layer" containing about 31 weight percent NaOH is separated from the top "organic layer" containing the 1-methoxy-2-aminopropane. The resulting 1-methoxy-2-aminopropane contained approximately 5 weight percent water.

2-Butoxy-1-aminoethane and 1-butoxy-2-aminopropane are not dried by the above mentioned method.

The glycol ether amines are distilled in either a 6 foot by 1.5 inch inside diameter glass column or a 2 foot by 1 inch diameter glass column, see Table 1. Both columns are fitted with overhead reflux splitters and packed with 0.25 inch ceramic saddles, and aside from scale are identical in form and function. The glycol ether amine is loaded into appropriately sized flasks for the amount of material available and attached to the bottom of a distillation column. For 2-butoxy-1-aminoethane and 1-butoxy-2-aminopropane, the columns are flushed with nitrogen, placed under vacuum and then heated. 1-methoxy-2-aminopropane is flushed with nitrogen but distilled at atmospheric pressure. Light impurities are taken overhead first followed by the desired glycol ether amine. The samples are distilled until the level of sample in the bottoms flask is no longer sufficient to ensure adequate coverage of the built-in thermocouple well. Cuts are taken at regular intervals, analyzed, and recombined based on purity. Information on distillation parameters is provided in Table 1.

Triplicate analysis of 0.15 g aliquots of the (purified) glycol ether amine diluted in 60 ml of deionized water are conducted using a Mettler Toledo DL67 titrator equipped with a DG115-SC sensor and standardized 0.1M HCl titrant. Standardization of the HCl titrant is performed by titrating a known amount of potassium hydrogen phthalate with NaOH solution and then using the standardized NaOH solution to titrate the HCl.

Purity of the aminated glycol ether is determined using the following formula and reported in Table 1:

$$\frac{\left(\frac{\text{mL 0.1 M HCl to equivalence point}}{10}\right)}{\left(\frac{\text{grams sample titrated}}{\frac{1000}{\text{molecular weight of animated glycol ether}}}\right)} \times 100\% = \text{Purity by Acid Titration}$$

TABLE 1

| Glycol Ether Amine | Column, ft | Pressure, mmHg | Reflux Ratio Reflux/Product | Purity, % |
|---|---|---|---|---|
| 2-butoxy-1-aminoethane | 6 | 46 | 10/1 | 98.8 |
| 1-methoxy-2-aminopropane | 6 | 742 | 10/1 | 97.4 |

TABLE 1-continued

| Glycol Ether Amine | Column, ft | Pressure, mmHg | Reflux Ratio Reflux/Product | Purity, % |
|---|---|---|---|---|
| 1-butoxy-2-aminopropane | 2 | 35 | 10/2 | 99.8 |
| 1-propoxy-2-aminopropane | | | | 96.1 |

Shale Inhibition Tests

Examples 1 to 4 are glycol ether amine shale inhibitors of the present invention tested on a sample of mud material comprising fresh water (348 ml), xanthan polymer (1.2 ppb), polyanionic cellulose (PAC, 1.5 parts per barrel), an amount of sodium hydroxide to provide a pH of 10, 50 g of 2 to 4 mm sized London clay cuttings (from an outcrop in the UK), and 350 ml of water to generate one barrel equivalent (i.e., 1 g per 350 ml=1 pound per barrel (ppb)) of base mud. 4 percent of a given glycol ether amine shale inhibitor is added to a bottle containing a sample of the well-bore material. Percents are based on weight of the total composition.

Cutting Recovery Test.

The bottles are capped and rolled at 185° F. for 16 hours. After rolling, the bottles are cooled to ambient temperature (68° F. to 77° F.), and the cuttings are carefully poured onto a 2 mm sieve and gently washed with fresh water. The cuttings are blotted dry and placed in a tared boat, and the wet mass measured ("water content weight"). The cuttings are then dried overnight, and the dry mass content is measured ("recovery weight"):

recovery weight/water content weight×100=percent recovery.

Cutting Hardness Test.

Using the same procedure described above, but with a duplicate set of bottles, the cuttings isolated just before oven drying are transferred to a hardness tester, and the amount of torque (pound force-inch (lbf-in)) needed to extrude the cuttings through small apertures located in the bottom of the test cell is recorded for every full rotation. The hardness tester used is custom built, but such devices are well known, for example see: Aston, M. S.; Elliot, G. P. Water-Based Glycol Drilling Muds: Shale Inhibition Mechanisms, Paper 28818; Presented at the SPE European Petroleum Conference, London, 25-27 Oct. 1994 and Patel, A. D. Design and Development of Quaternary Amine Compounds: Shale Inhibition with Improved Environmental Profile, Paper 121737; Presented at the SPE International Symposium on Oilfield Chemistry, The Woodlands, 20-22 Apr. 2009. The maximum gauge reading of the hardness tester is 300 lbf-in. Hardness values reported in Table 2 are reported as the maximum torque reached and the number of turns required to reach the maximum torque.

The glycol ether amine shale inhibitor, cutting recovery, hardness performance, and water content are summarized in Table 2. Additives which are able to maintain shale hardness, and thus, provide greater resistance to extrusion are favored. Higher recovery means that the shale is rendered less reactive (e.g. dispersive) and more stable. More resistance, or recovery, means that the integrity or strength of the shale has been better preserved when exposed to the drilling fluid. Water content is determined by comparing the wet mass with the dry mass.

TABLE 2

| Example | Glycol Ether Amine | % Recovery | % Water | Hardness, max. torque (lbf-in) × no. turns |
|---|---|---|---|---|
| 1 | 2-butoxy-1-aminoethane | 75.4 | 39.6 | 190 × 5 |
| 2 | 1-methoxy-2-aminopropane | 52.2 | 40.2 | 110 × 4 |
| 3 | 1-butoxy-2-aminopropane | 97.6 | 34.4 | 290* × 3 |
| 4 | 1-propoxy-2-aminopropane | 98.2 | 32.8 | 300* × 3 |

*max. torque of sample exceeds the upper limit (300 lbf-in) of the hardness tester gauge

The invention claimed is:

1. An aqueous based drilling fluid composition consisting of:
   i) an aqueous based continuous phase;
   ii) a reactive clay or shale material;
   iii) a shale hydration inhibition agent selected from: 2-methoxy-1-aminoethane, 2-ethoxy-1-aminoethane, 2-propoxy-1-aminoethane, 2-butoxy-1-aminoethane, 1-methoxy-2-aminopropane, 1-ethoxy-2-aminopropane, 1-propoxy-2-aminopropane, or 1-butoxy-2-aminopropane;
   wherein the shale hydration inhibition agent is present in an amount of 1 to 18 pounds per barrel (2.85 kg/m$^3$ to 51.3 kg/m$^3$);
   and
   iv) optionally one or more of a fluid loss control agent, a weighting material, a viscosifying agent, a dispersant, a lubricant, a corrosion inhibitor, a defoamer, or a surfactant.

2. The composition of claim 1 wherein the aqueous based continuous phase is fresh water, sea water, brine, mixtures of water and water soluble organic compounds, or mixtures thereof.

3. A method for reducing the reactivity of clays and shale in drilling operations comprising the use of an aqueous based drilling fluid consisting of a shale hydration inhibition agent selected from: 2-methoxy-1-aminoethane, 2-ethoxy-1-aminoethane, 2-propoxy-1-aminoethane, 2-butoxy-1-aminoethane, 1-methoxy-2-aminopropane, 1-ethoxy-2-aminopropane, 1-propoxy-2-aminopropane, or 1-butoxy-2-aminopropane,
   wherein the shale hydration inhibition agent is present in an amount of 1 to 18 pounds per barrel (2.85 kg/m$^3$ to 51.3 kg/m$^3$) and optionally one or more of a fluid loss control agent, a weighting material, a viscosifying agent, a dispersant, a lubricant, a corrosion inhibitor, a defoamer, or a surfactant.

4. The method of claim 3 wherein the aqueous based continuous phase is fresh water, sea water, brine, mixtures of water and water soluble organic compounds, or mixtures thereof.

* * * * *